United States Patent
Moretto et al.

(10) Patent No.: US 10,515,000 B2
(45) Date of Patent: *Dec. 24, 2019

(54) SYSTEMS AND METHODS FOR PERFORMANCE TESTING CLOUD APPLICATIONS FROM MULTIPLE DIFFERENT GEOGRAPHIC LOCATIONS

(71) Applicant: Cloudy Days, Inc., Portland, OR (US)

(72) Inventors: Paola Moretto, Portland, OR (US); Paola Rossaro, San Francisco, CA (US); Shawn MacArthur, Portland, OR (US)

(73) Assignee: Cloudy Days, Inc., Portland, OR (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/652,037

(22) Filed: Jul. 17, 2017

(65) Prior Publication Data
US 2017/0315902 A1    Nov. 2, 2017

Related U.S. Application Data

(63) Continuation-in-part of application No. 14/830,068, filed on Aug. 19, 2015, now Pat. No. 9,811,445.

(Continued)

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC .. G06F 11/3664; G06F 11/3672; G06F 11/34; G06F 11/3688; G06F 11/3684; G06F 11/3692

(Continued)

(56) References Cited

U.S. PATENT DOCUMENTS 6,738,813 B1    5/2004  Reichman
7,526,680 B2    4/2009  Matthew et al.

(Continued)

OTHER PUBLICATIONS

Wikipedia "Software as a service" page from date Aug. 21, 2014, retrieved using the WayBackMachine, from https://web.archive.org/web/20140821151735/https://en.wikipedia.org/wiki/Software_as_a_service (Year: 2014).*

*Primary Examiner* — Yair Leibovich

(57) ABSTRACT

A method and system for testing the end-to-end performance of cloud based applications. Real workload is created for the cloud based applications using synthetic users. The load and length of demand may be adjusted to address different models allowing the measurement and analysis of user performance metrics under desired conditions. Web applications and other cloud services may be tested from multiple cloud-based concurrent geographic locations in the world. The method may include generating controlled and complex web load from multiple concurrent geographic locations. The method may also include splitting traffic among multiple geographic locations. The method may also include processing test results and generating performance metrics per location as well as comparing locations. The method may also be applicable to cloud services such as mobile apps and API endpoints.

11 Claims, 15 Drawing Sheets

Related U.S. Application Data

(60) Provisional application No. 62/363,718, filed on Jul. 18, 2016, provisional application No. 62/042,165, filed on Aug. 26, 2014.

(58) Field of Classification Search
USPC .................................................. 714/47.1
See application file for complete search history.

(56) References Cited

U.S. PATENT DOCUMENTS

| | | |
|---|---|---|
| 7,587,638 B2 | 9/2009 | Shah et al. |
| 7,908,590 B1 | 3/2011 | Min et al. |
| 7,970,890 B1 | 6/2011 | Krivopaltsev et al. |
| 8,005,644 B1 | 8/2011 | Evans |
| 8,341,462 B2 | 12/2012 | Broda et al. |
| 8,732,663 B2 | 5/2014 | Nagata et al. |
| 8,826,068 B2 | 9/2014 | Somendra |
| 8,839,035 B1 | 9/2014 | Dimitovich et al. |
| 8,868,749 B2 | 10/2014 | Barti-Walcott et al. |
| 9,032,373 B1* | 5/2015 | Gupta ............... G06F 11/3688 717/127 |
| 9,235,491 B2 | 1/2016 | Kimmet et al. |
| 9,558,465 B1 | 1/2017 | Arguelles et al. |
| 9,588,820 B2 | 3/2017 | Ravi et al. |
| 9,727,449 B2 | 8/2017 | Hermeto et al. |
| 2002/0087679 A1 | 7/2002 | Pulley et al. |
| 2002/0138226 A1 | 9/2002 | Doane |
| 2002/0177977 A1 | 11/2002 | Scarlat et al. |
| 2003/0009544 A1 | 1/2003 | Wach |
| 2004/0059544 A1 | 3/2004 | Smocha et al. |
| 2005/0086643 A1 | 4/2005 | Shane |
| 2005/0138104 A1 | 6/2005 | Houh et al. |
| 2006/0265190 A1 | 11/2006 | Hein |
| 2007/0180430 A1 | 8/2007 | Farchi |
| 2007/0185984 A1 | 8/2007 | Roth |
| 2008/0086627 A1 | 4/2008 | Splaine |
| 2008/0133435 A1 | 6/2008 | Chintalapti et al. |
| 2009/0199096 A1 | 8/2009 | Pop-jordanov et al. |
| 2010/0124886 A1 | 5/2010 | Fordham et al. |
| 2010/0146487 A1 | 6/2010 | Chun et al. |
| 2011/0145392 A1 | 6/2011 | Dawson et al. |
| 2012/0011486 A1 | 1/2012 | Murthy et al. |
| 2012/0017112 A1* | 1/2012 | Broda ............... G06F 9/5083 714/4.4 |
| 2012/0117545 A1 | 5/2012 | Yokoi |
| 2013/0054792 A1 | 2/2013 | Sharaf |
| 2013/0080634 A1 | 3/2013 | Grelewicz et al. |
| 2013/0097706 A1* | 4/2013 | Titonis ............... G06F 21/56 726/24 |
| 2013/0276125 A1 | 10/2013 | Bailey |
| 2014/0068335 A1* | 3/2014 | Bromley ............... H04L 43/50 714/32 |
| 2014/0215077 A1 | 7/2014 | Soudan et al. |
| 2014/0258987 A1 | 9/2014 | Zhou et al. |
| 2014/0278590 A1 | 9/2014 | Abbassi et al. |
| 2014/0351394 A1* | 11/2014 | Elisha ............... H04L 41/0806 709/222 |
| 2015/0019301 A1 | 1/2015 | Jung et al. |
| 2015/0222494 A1* | 8/2015 | Broda ............... H04L 41/22 715/736 |
| 2015/0242294 A1* | 8/2015 | Lapierre ............... G06F 11/079 714/37 |
| 2015/0347268 A1 | 12/2015 | Garrett et al. |
| 2015/0358391 A1 | 12/2015 | Moon et al. |
| 2016/0098341 A1 | 4/2016 | Pho et al. |
| 2016/0188445 A1 | 6/2016 | Hermeto et al. |
| 2016/0301732 A1 | 10/2016 | Moretto et al. |
| 2016/0314064 A1 | 10/2016 | Moretto et al. |
| 2016/0366029 A1 | 12/2016 | Gardner et al. |

* cited by examiner

SYSTEMS AND METHODS FOR PERFORMANCE TESTING CLOUD APPLICATIONS FROM MULTIPLE DIFFERENT GEOGRAPHIC LOCATIONS

CROSS-REFERENCE TO RELATED APPLICATIONS

This application is a continuation-in-part of U.S. patent application Ser. No. 14/830,068 filed Aug. 19, 2015 and entitled "Methods and Systems for the Use of Synthetic Users To Performance Test Cloud Applications" which claims the benefit of U.S. Provisional Patent Application No. 62/042,165 filed Aug. 26, 2014 and entitled "Use of Synthetic Users to performance Test cloud Applications in the cloud," the disclosures of which are incorporated herein by reference in their entireties. This application also claims the benefit of U.S. Provisional Patent Application No. 62/363,718 filed Jul. 18, 2016 and entitled "Systems and Methods for Performance Testing Cloud Applications From Multiple Different Geographic Locations," the disclosure of which is incorporated herein by reference in its entirety.

BACKGROUND

In the cloud, computing resources often appear as a homogeneous pool. In reality, computing resources are a variety of different servers, computing, storage, networking and data center operations, all of which may be managed by the cloud provider. The cloud is typically device and location independent in that a user may not know the actual device or location where a component or resource physically resides. Components may access resources, such as processors or storage, without knowing the location of the resource. The provisioning of the computing resources, as well as load balancing among them, is the responsibility of the cloud service provider. This reliance on outsourced resources makes it difficult for companies deploying their applications to determine any issues with the performance of their applications under high traffic/data scenarios.

High traffic/data scenarios can be reproduced with hardware and simulations. Testing using hardware requires a large amount of hardware infrastructure and is expensive. Simulations do not provide an accurate account of the behavior of real users. Additionally, while current testing methods provide some level of information on the performance at the server level, they do not provide information on end-to-end performance at the user level. There is therefore a need for better performance testing solutions for cloud-based applications.

An additional problem is that, for cloud services for web applications, mobile applications, and API endpoints with global reach, it is very difficult to measure performance under high traffic coming from multiple concurrent geographic locations. In a real application traffic comes from users in different geographies, sometimes within the same country or from locations around the world. Accordingly, there also exists a need for better performance testing solutions for cloud-based services that encounter traffic from multiple concurrent geographic locations.

A further problem is that, as traffic moves increasingly towards mobile networks, it becomes more difficult to evaluate the performance of cloud services because of the variability of network conditions. Accordingly, there also exists a need for better performance testing solutions for cloud-based services such as web applications, mobile applications, and API endpoints under different network conditions.

BRIEF SUMMARY

It should be appreciated that this Summary is provided to introduce a selection of concepts in a simplified form that are further described below in the Detailed Description. It contains, by necessity, simplifications, generalization, and omissions of detail; consequently, those skilled in the art will appreciate that the Summary is illustrative only and is not intended to be in any way limiting.

Systems and methods described herein disclose means for testing applications, particularly cloud based applications. In some embodiments, the systems described herein may be considered a network cloud resource allocation system. In some embodiments, a method for testing cloud based applications may include inputting of test parameters by a user, creating a test based on the test parameters inputted by the user, bringing on-line hardware and software resources in a cloud based system required to execute the test, generating a group of synthetic users required by the test parameters, executing the test, collecting data from an Application under Test challenged by the test, processing and displaying user performance metrics from the test, producing recommendations for optimizing performance of the Application under Test, and/or implementing the recommendations for the Application under Test thereby altering its allocation of resources. The test parameters may include, but are not limited to, a Uniform Resource Identifier for the Application under Test, an amount of traffic to be generated, a type of traffic to be generated, a Geo location of the synthetic users which may be local or global, a test duration, and a scheduler. The scheduler may allow for any type of behavior normally instituted by a scheduler including, but not limited to, periodic testing, think time, randomness, browser type and real browser testing.

In other embodiments, a cloud based performance testing system may include a test creation and management interface in a cloud; an execution mechanism on an application server which receives requests from the test creation and management interface in the cloud, processes the requests and generates a load responsive to a timer control and traffic model logic in cooperation with an elastic load balancer based on parameters specified in the test creation and management interface and directed against an Application under Test in the cloud; a results mechanism that collects, processes and stores performance measurements of the Application under Test in response to the load generated by the execution mechanism; and/or a display mechanism that presents the performance measurements collected by the results mechanism and recommendations for optimizing performance of the Application under Test. In some embodiments, the execution mechanism may include a configuration module, a master module, a client instance module and a job creation module. In further embodiments, the recommendations may be applied to the Application under Test. Performance measurements may be of any measure desired by the user including, but not limited to, average transaction times in comparison to traffic, statistical distribution of transaction times, average and worst case page load time, average and worst case time-to-interact, error rates and error types distribution. The behavior of the Application under Test may be presented as raw or processed data or both. In additional embodiments, the test creation and management interface allows inputting of the parameters for the requests by a user. Parameters may include, but are not limited to, a Uniform Resource Identifier for the Application under Test, an amount of traffic to be generated, a type of traffic to be generated, a Geo location of synthetic users, a test duration, and a scheduler.

In further embodiments, a cloud based performance testing system may include a group of remotely distributed subscriber computers connected to an internet; a network interface to the group of remotely distributed subscriber computers; a group of application servers which receive requests sent by the remotely distributed subscriber computers to test an application; a group of traffic generator computers responsive to a time control and traffic model logic which receive instructions from the group of application servers to generate synthetic user load; an Application under Test residing on a second computer connected to the internet against which the synthetic user load is directed; a Master Database residing on a first computer which records the test and receives, records and processes measurements of a performance of the Application under Test in response to the synthetic user load; and/or a user interface which displays data of the performance of the Application under Test. The remotely distributed subscriber computers may be locally or globally distributed. In some embodiments, the data of the performance of the Application under Test causes generation of recommendations for optimization of the Application under Test. In additional embodiments, the group of application servers place their instructions in a queue as an instance.

In further embodiments, a network cloud resource allocation system may include a web load traffic generator responsive to a timer control and traffic model logic; a network interface to a group of remote subscriber devices; an elastic load balancer; a group of application servers each coupled to a network job queue; logic to operate the web load traffic generator in cooperation with the elastic load balancer and the group of application servers to generate network traffic from the network job queue and to direct the network traffic to an Application under Test; and/or a measurement assembly to record, process, and store performance measurements of the Application under Test in response to the network traffic in a database.

In further embodiments, a cloud based performance testing system includes: a test creation and management interface in a cloud; an execution mechanism on an application server which receives requests from the test creation and management interface in the cloud, processes the requests and generates load concurrently from multiple geographic locations in cooperation with an elastic load balancer based on parameters specified in the test creation and management interface and directed against a service under test in the cloud; a results mechanism hardware server that collects, processes and stores performance measurements of the service under test from the multiple geographic locations in response to the load generated by the execution mechanism; and a display mechanism that presents on a screen the performance measurements collected by the results mechanism.

In further embodiments, a cloud based performance testing system includes: a plurality of remotely distributed subscriber computers connected to an internet; a network interface to the plurality of remotely distributed subscriber computers; a plurality of application servers which receive requests sent by the remotely distributed subscriber computers to test a cloud service; a plurality of traffic generator computers located in multiple geographic regions which receive instructions from the plurality of application servers to generate synthetic user load concurrently in the multiple geographic regions; a service under test residing on one or more first computers connected to the internet against which the synthetic user load is directed; a master database residing on a second computer which receives, records and processes measurements of a performance of the service under test in response to the synthetic user load; and a user interface which displays data of the performance of the service under test.

In further embodiments, a method for testing cloud based applications includes: inputting of test parameters by a user, wherein the test parameters include multiple geographic regions; creating a test based on the test parameters inputted by the user; bringing on-line cloud based hardware and software resources in the multiple geographic regions required to execute the test; generating a plurality of synthetic users in the multiple geographic regions required by the test parameters; executing the test; collecting data from a service under test challenged by the test in the multiple geographic regions; and processing and displaying performance metrics from the test.

To the accomplishment of the foregoing and related ends, certain illustrative aspects of the system are described herein in connection with the following description and the attached drawings. The features, functions, and advantages that have been discussed can be achieved independently in various embodiments of the present disclosure or may be combined in yet other embodiments, further details of which can be seen with reference to the following description and drawings. The summary is provided to introduce a selection of concepts in a simplified form that are further described below in the Detailed Description. This summary is not intended to identify key features or essential features of any subject matter described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
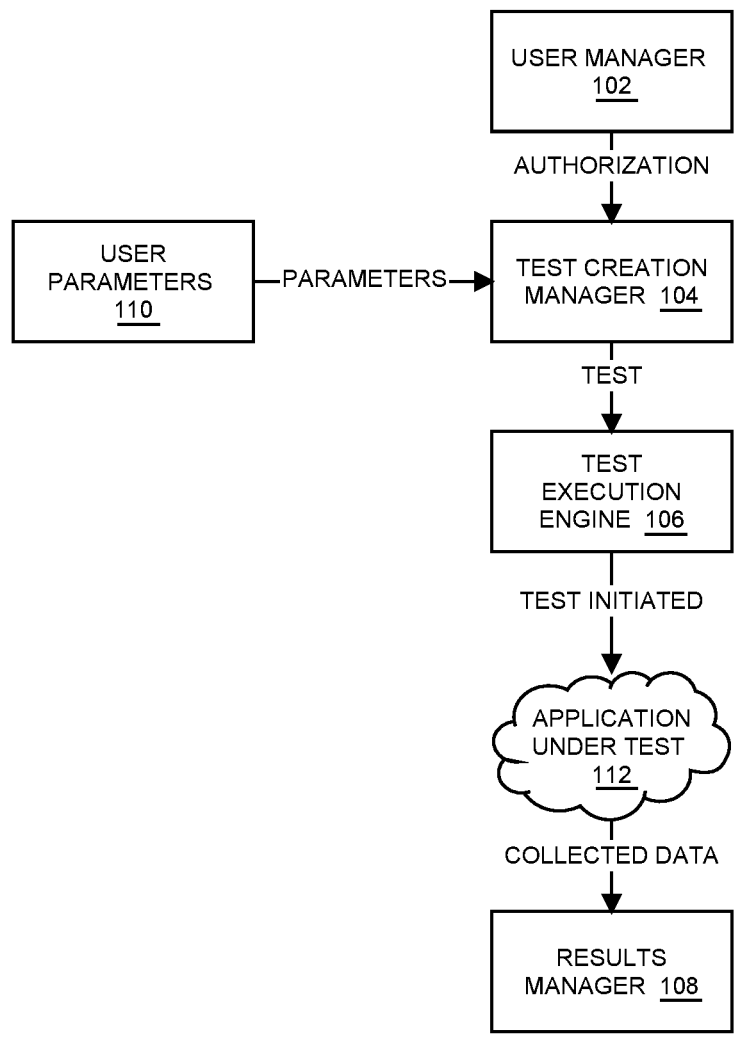
FIG. 1 is a block diagram of an embodiment of a system for performance testing cloud based applications.

"Elastic Load Balancing" in this context refers to a load balancing solution that automatically scales its request-handling capacity in response to incoming application traffic.

"Busy hour" in this context refers to a one hour period within a specified interval of time (typically 24 hours) in which the traffic load in a network or sub-network is greatest.

"Cloud" in this context refers to device resources delivered as a service over a network (typically the Internet).

"Database" in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

"Hit time" in this context refers to the time to access the upper level of the memory hierarchy.

"Load Balancing" in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

"Map-reduce" in this context refers to a data processing paradigm for condensing large volumes of data into useful aggregated results.

"Master/slave database" in this context refers to a model of communication where one device or process has unidirectional control over one or more other devices. In some systems a master is elected from a group of eligible devices, with the other devices acting in the role of slaves.

"Module" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process.

"Non-relational Database" in this context refers to a database that does not incorporate the table/key model that relational database management systems (RDBMS) promote. These kinds of databases require data manipulation techniques and processes designed to provide solutions to big data problems.

"Portal" in this context refers to a web site or other network component that offers an aggregation of resources and services, such as e-mail, forums, search engines, and online shopping.

"Profile" in this context refers to a machine memory organization representing a set of correlated values associated with a physical thing (object, person, etc.)

"Queue" in this context refers to a sequence of work objects that are awaiting processing.

"Redis Queue (RQ)" in this context refers to a simple Python library for queuing jobs and processing them in the background with workers.

"Relational Database" in this context refers to a database structured to recognize relations among stored items of information.

"Spawn" in this context refers to a function that loads and executes a new child process. The current process may wait for the child to terminate or may continue to execute asynchronously. Creating a new subprocess requires enough memory in which both the child process and the current program can execute.

"Spin-up" in this context refers to a hard disk drive or optical disc drive accelerating its platters or inserted optical disc from a stopped state to an operational speed.

"Synthetic user" in this context refers to a virtual user that operates externally to the system and mimics real user behavior by running through user paths on the website or application.

"Think time" in this context refers to the time taken by the users to think or to navigate to different pages in the application.

"Uniform Resource Identifier (URL)" in this context refers to the global address of documents and other resources on the World Wide Web. The URL uses a protocol identifier and a resource name that identifies the IP address or the domain name where the resource is located. The URL format is specified in RFC 1738 Uniform Resource Locators (URL).

"Web page" in this context refers to a file configured for access and display via a web browser over the Internet, or Internet-compatible networks. Also, logic defining an information container that is suitable for access and display using Internet standard protocols. Content defined in a web page is typically accessed using a web browser, and displayed. Web pages may provide navigation to other web pages or content via hypertext links. Web pages frequently subsume other resources such as style sheets, scripts and images into their final presentation. Web pages may be retrieved for display from a local storage device, or from a remote web server via a network connection.

Description

Described herein is a method and system of using cloud resources to execute performance testing of an application. The system and applications being tested may be supported by the same or different cloud providers. In some embodiments such a system may be used to test speed and responsiveness of an Application under Test as experienced by the application's current and prospective users. Using synthetic users, the system may generate web-load on demand for specified durations of time for the purpose of stress testing applications according to specific traffic models. For example, a plurality of remote subscriber computers distributed globally are connected to computer networks including interconnected computer networks such as the internet. The remote subscriber computers generate requests for testing which are processed by an elastic load balancer and transmitted to a plurality of application servers. The application servers transfer requests into a queue on the application servers. The queue transmits information to a plurality of computers to instantiate traffic by synthetic users. The generated traffic is sent against an Application under Test running on a remote computer connected to the internet. The behavior of the Application under Test is recorded, processed and stored in a non-relational database. By measuring user performance metrics resulting from the synthetic users, the owner of the test application is able to uncover and address application performance issues.

The system comprises User Manager 102, Test Creation Manager 104, Test Execution Engine 106, Results Manager 108, User Parameters 110, and acts on Application under test 112. In some embodiments, the User Manager 102 may manage account creation, log in, and access to users of the system. Access to the system may be the same or different for all users in a company. For example in some embodiments, users may be allowed to run tests. In other embodiments, users may be allowed to create tests. In further embodiments, users may be allowed to run and create tests. Account creation and access may be performed using any means generally known to those of skill in the art. In some embodiments, creation of the account may require authentication information for the account including, but not limited to, sending authentication information to a messaging address of the user. In other embodiments, accounts may be created by an administrator. Each account can have one or multiple users. In some embodiments, an account is created for a company and user identification is created for each user of the account. Such users may have the same or different amounts of access and control to the account. For example, a user may have viewing access, reading/writing access or administrative access to the information and results used within and created by the testing process. In some embodiments, a user may be allowed to invite other users to use the account and/or create additional user profiles for an account. In other embodiments only those with administrative access to the account may add users. In further embodiments, both those with administrative access and users may invite other users to use the account and/or create additional user profiles for an account. In some embodiments, an account may additionally include billing information.

In one embodiment, the system includes at least one processor and memory storing instructions configured to instruct the at least one processor to receive data from user and in response to receiving the data, create an account for the user and authentication information for the account. Authentication information may then be sent to a messaging address of the user.

Test Creation Manager 104 enables the creation, archiving, retrieval and editing of test scenarios and test plans. A user may choose one or more parameters as the basis for the test including, but not limited to, a Uniform Resource Identifier (URI) for the application to be tested, the amount of traffic to be generated, the type of traffic to be generated, the Geo location of the synthetic users, the test duration, an identifier for the test, and a which allows for periodic testing, think time, internet traffic model, randomness, browser type, and real browser testing. Randomness can be added to one or more aspects of the scheduler including think time, internet traffic models, visit durations, and hit time. In some embodiments, each test is linked to the account from which they are created. In other embodiments, each test is linked to the user who created it. In further embodiments, there may be predefined tests which can be selected by the user. Such predefined tests may be standardized testing models or may be previously created by the account holder or other users within that account. In some embodiments, a predefined test may be editable by the user. In other embodiments, predefined tests are immutable. In further embodiments a test must be created each time a user logs into the system.

Tests may include one or more user traffic patterns. The type of traffic generated may be created by the user or elected from predefined patterns including, but not limited to, high flat in which the web load stays the same throughout the duration of the test, linear ramp in which the traffic grows linearly for the duration of the test, sharp peak in which the traffic shows a burst during the test execution and then returns to the normal state, and the like. In some embodiments, internet traffic models may be based on network state variables, policy variables, and decision variables. In other tests, certain parameters may be randomized. For example, a test may start with a linear ramp and then flatten out, or the number of synthetic users may change periodically. In some embodiments, the synthetic users may be generated via software and generate real traffic against the Application under Test according to a plurality of traffic models and durations. The number of synthetic users generated in the cloud can be increased or decreased according to the parameters defined by the user running the tests. Such synthetic users generate real traffic (web-load) against the Application under Test. Each test and/or run of a test may be saved in a test database and assigned a unique identifier.

In some embodiments, tests may be stored in the Test Creation Manager 104. In other embodiments, tests may be stored in an archive and retrieval module. Such an archive may save the test and its parameters under its unique identifier in a test database. A user may be presented with a menu of previously archived tests to chose from. Once the user selects a test it is retrieved from the database. In some embodiments the user can remove a test from the archive. In other embodiments, the user can elect to run a test. In further embodiments, a user may elect to edit a test including the parameters and the Application under Test. Both the test creation manager and the archive provide a test creation and management interface available in the cloud and responsive to the user.

The selected or created test may be initiated using an execution mechanism such as the Test Execution Engine 106. The Test Execution Engine 106 may be made of one or more modules which may be independent of each other. For example, in some embodiments, the Test Execution Engine 106 may include a configuration module, master module, client instance module, and job creation module. The master module may receive requests from the front end, send requests for configuring the module, verify the information is correct, send requests to a job creation module and communicate with the Results Manager 108. Instances of tests may be prepared by the configuration module. The client instance module may configure instances and booting as many instances as needed. The job creation module prepares the set of instructions for execution of the test. For example, the job creation module may determine the rate of repetition of the test, traffic distribution, timing mechanism, test duration (whole test duration), test identifier, and traffic model. In some embodiments, the jobs are executed by a server instance module which may check the job queue for requests and execute instances. The queue may be in any form generally used by one of skill in the art and is generally a means for putting values into a list on the producer side and waiting for these values to be consumed on the consumer side using various polling mechanisms. Exemplary queues include, but are not limited to, a Redis queue.

The Test Execution Engine 106 may send information to the Results Manager 108 when a test execution begins, when a test execution ends, or at any time point in between. The Results Manager 108 may present raw data from each instance of the test, or may aggregate data from each instance with the same test identification for example using a map reduce algorithm. Such map reduce algorithm may be run in any non-relational database including, but not limited to nonSQL and Mongo. In some embodiments, the Results Manager 108 may present performance metrics automatically upon completion of the test. In other embodiments, the Results Manager 108 may present performance metrics periodically throughout the run of the test. In further embodiments, the Results Manager 108 may present performance metrics periodically and upon completion of the test. Such performance metrics may include, but are not limited to average transaction times versus traffic, statistical distribution of transaction times, average and worst case page load time, average and worst case time-to-interact, error rates and error types distribution. Such information may be presented in any format useful to the user including as text, graphs, charts, tables, cascade diagrams, scatter plots, heat maps, or any other format useful to the user. The data may be parsed to reveal behavior under a subset of conditions for example at a specific traffic level, a specific time, or when specific conditions occur such as at a particular point on a transaction time graph. In some embodiments, test results are assigned a specific test identifier. Results may additionally include a time stamp or other identifier so that it is possible to identify the sequence in which a test was run, i.e. before or after changes to an application. In some embodiments, the test results may be saved in a separate database accessible by the system such as Results Database 422. Each result is associated with the test identifier and the result identifier that identifies a single execution of the test. For example, a Results Engine 420 may receive a "START test" instruction from the Test Execution Engine 402. Raw timing data from Instance 1 . . . n 414 may be saved to the Results Database 422 along with the identifiers needed for the Results Engine 420 to retrieve the data. The Results Engine 420 periodically processes the data as the test executes. The processed data is then saved and/or sent to the front end Results Display 424. When the Results Engine 420 receives the "END test" instruction from the Test Execution Engine 402, it completes the last batch of results and performs any additional analysis associated with the test.

The techniques and procedures described herein may be implemented via logic distributed in one or more computing devices. The particular distribution and choice of logic may vary according to implementation. In some embodiments, a plurality of remotely distributed subscriber computers are connected to the internet. Requests from the plurality of remotely distributed subscriber computers are distributed through elastic load balancing, i.e., automatic scaling of request-handling capacity in response to incoming application traffic. Such requests may be concurrent, consecutive, or some combination thereof. The requests are then sent to a plurality of application servers, 1-*x*. The number of application servers may increase or decrease x times depending on the load received. The plurality of application servers store the data received in a Master Database on a first computer. The Master Database may be in communication with one or more slave databases on the same or separate computers, for example through the use of relational database. The application servers process the data received to formulate them as requests in a queue on the application servers. The requests are transmitted as instances on a plurality of traffic generator computers. Each traffic generator computer is responsive to a timer control and applies traffic model logic to generate the required amount of traffic in the form of synthetic users in cooperation with the elastic load balancer and the plurality of application servers to generate network traffic from the network job queue. The traffic is sent against an application under test residing on one or more second computers. The behavior of the application under test is recorded and processed and the data is transmitted to, recorded and stored by the Master Database which can be accessed by one or more users seeking to view the raw and/or processed data seeking information on the behavior of the application under test. The data received generates recommendations which are then applied to the Application under Test to improve resource utilization and allocation or other performance issues by the application under test including re-allocation of bandwidth and memory used by the application under test in response to changes in loads.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Embodiments of an application performance testing system have been described. The following claims are directed to said embodiments, but do not preempt application performance testing in the abstract. Those having skill in the art will recognize numerous other approaches to application performance testing are possible and/or utilized commercially, precluding any possibility of preemption in the abstract. However, the claimed system improves, in one or more specific ways, the operation of a machine system for application performance testing, and thus distinguishes from other approaches to the same problem/process in how its physical arrangement of a machine system determines the system's operation and ultimate effects on the material environment. The terms used in the appended claims are defined herein in the glossary section, with the proviso that the claim terms may be used in a different manner if so defined by express recitation.

DRAWINGS

Figure 2:
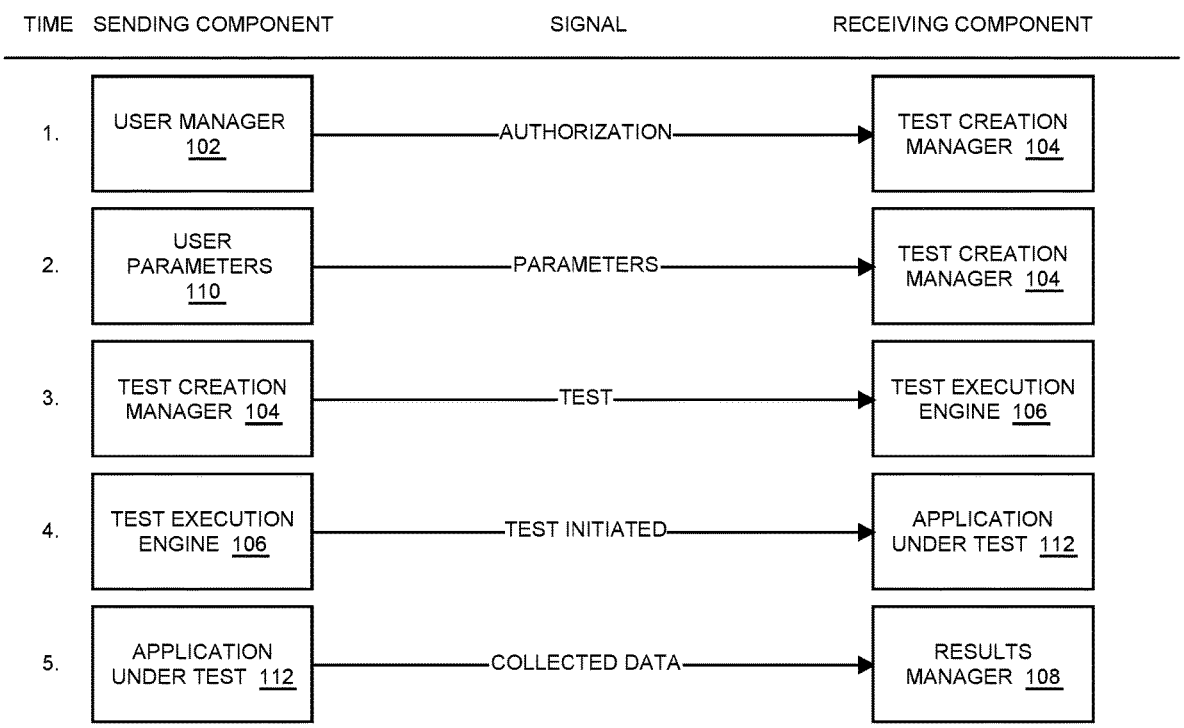
FIG. 2 is an action flow diagram of an embodiment of a system for performance testing cloud based applications.
Figure 3:
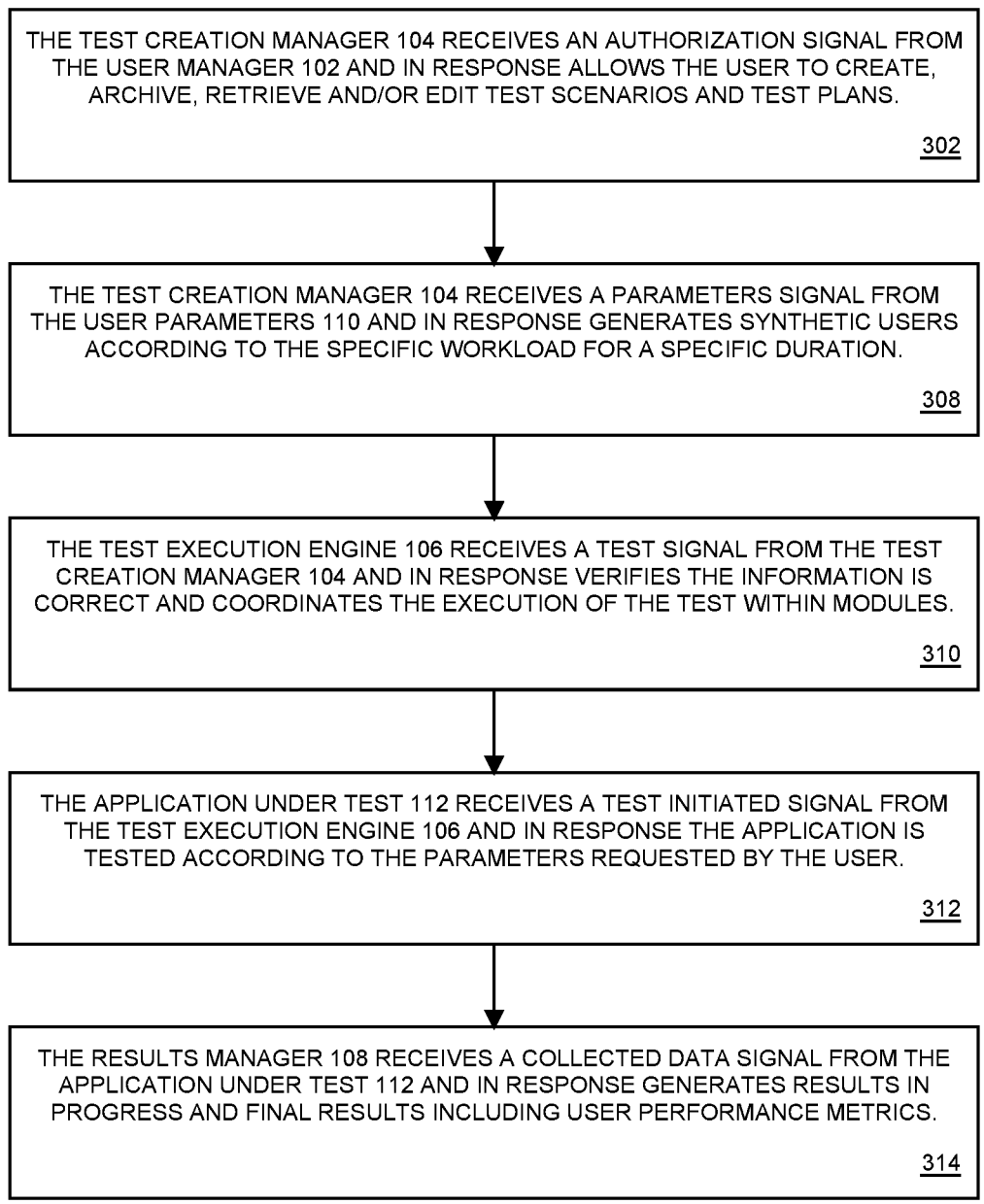
FIG. 3 is a flow chart of an embodiment of a system for performance testing cloud based applications.

FIG. 1 is a block diagram of an embodiment of a system for performance testing cloud based applications. FIG. 2 is an action flow diagram of an embodiment of a system for performance testing cloud based applications. FIG. 3 is a flow chart of an embodiment of a system for performance testing cloud based applications. The system comprises User Manager 102, Test Creation Manager 104, Test Execution Engine 106, Results Manager 108, User Parameters 110, and Application under test 112. The Test Creation Manager 104 receives an Authorization signal from the User Manager 102 and in response allows the user to create, archive, retrieve and/or edit test scenarios and test plans (302). The Test Creation Manager 104 receives a parameters signal from the User Parameters 110 and in response generates synthetic users according to the specific workload for a specific duration (308). The Test Execution Engine 106 receives a test signal from the Test Creation Manager 104 and in response verifies the information is correct and coordinates the execution of the test within modules (310). The Application under test 112 receives a Test Initiated signal from the Test Execution Engine 106 and in response the application is tested according to the parameters requested by the user (312). The Results Manager 108 receives a Collected Data signal from the Application under test 112 and in response generates results in progress and final results including user performance metrics (314).

Figure 4:
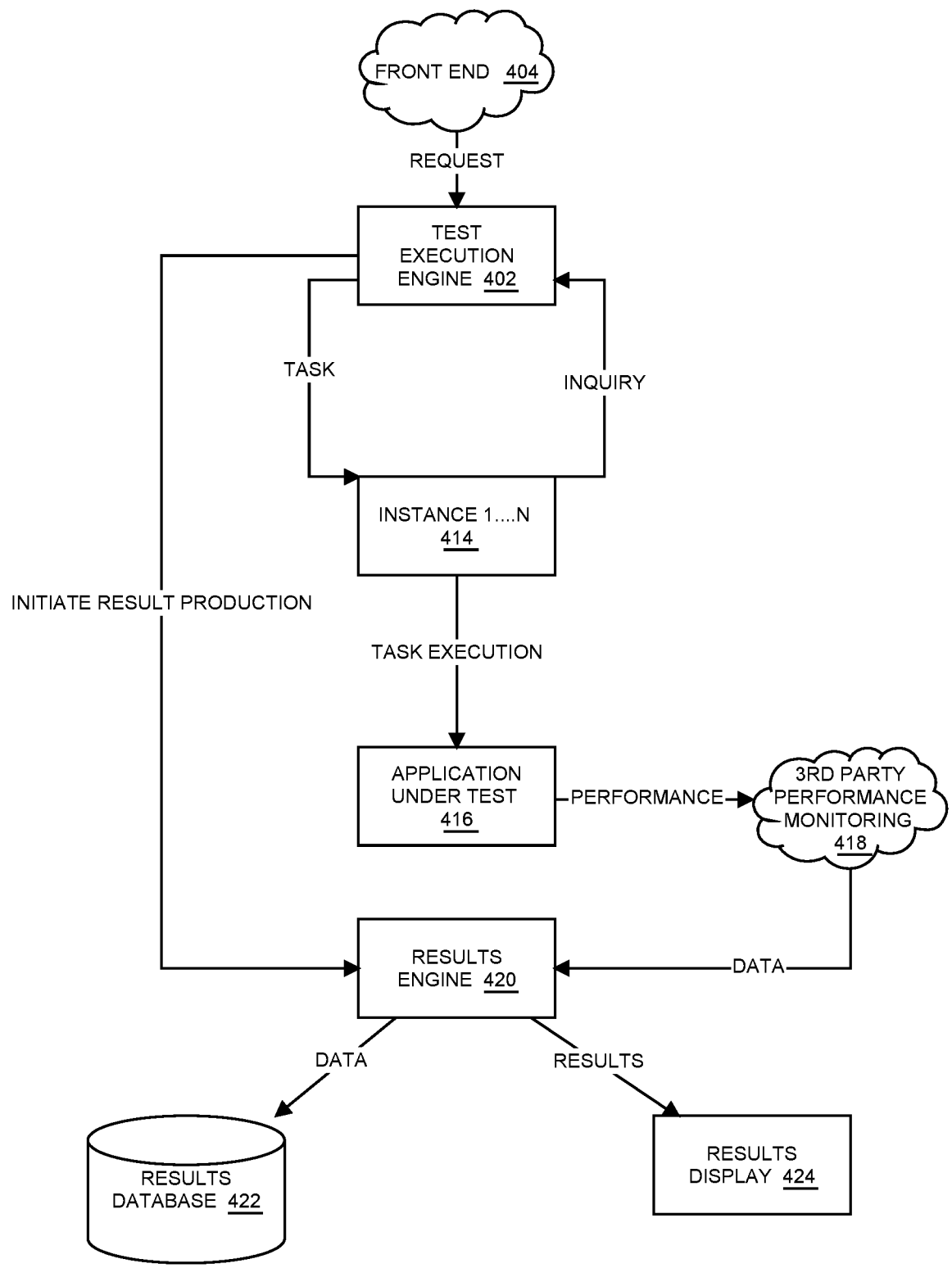
FIG. 4 is a diagram of an embodiment of a system for performance testing cloud based applications.
Figure 5:
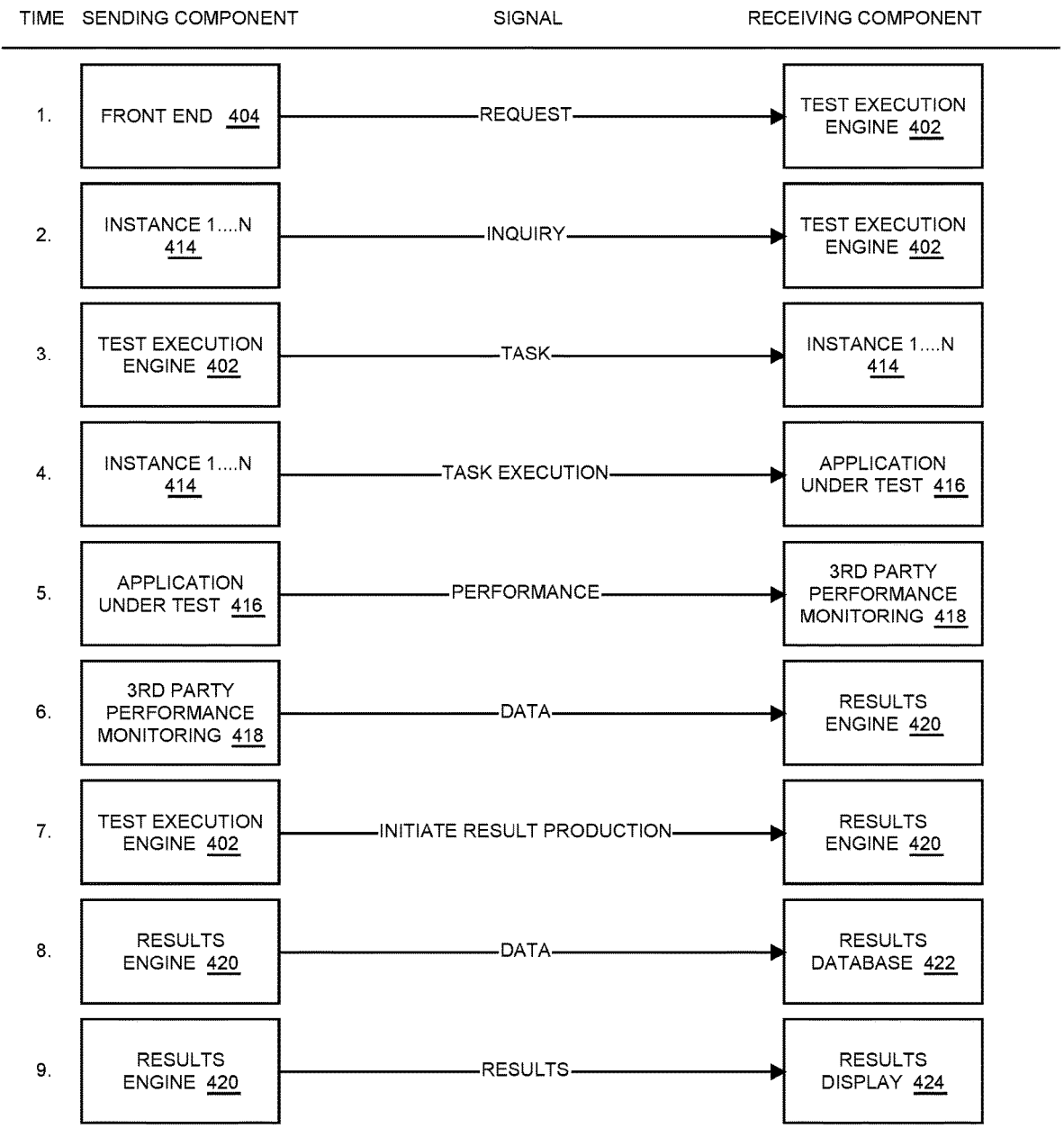
FIG. 5 is an action flow diagram of an embodiment of a system for performance testing cloud based applications.
Figure 6:
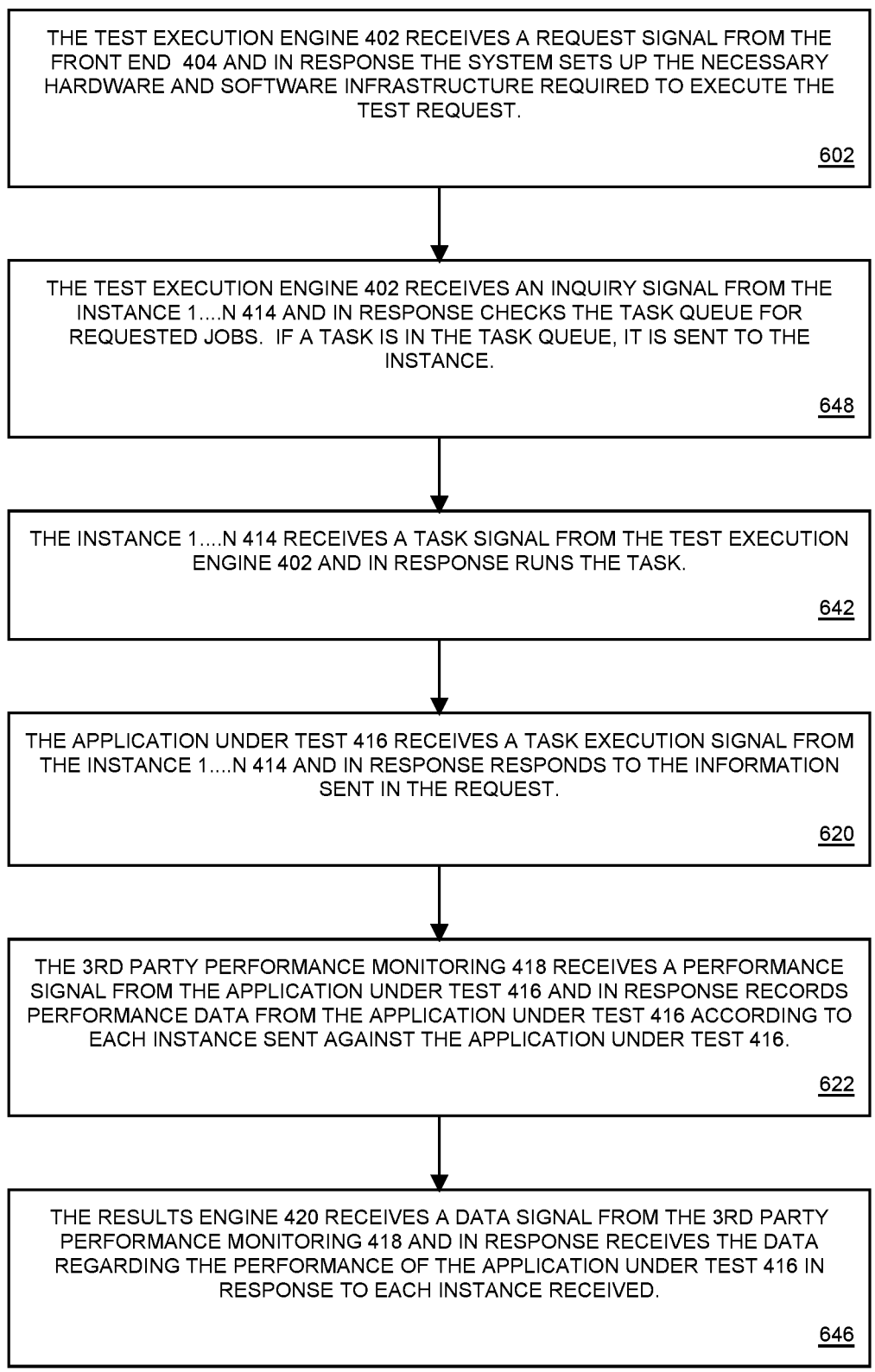
FIG. 6 is a flow chart of an embodiment of a system for performance testing cloud based applications.
Figure 7:
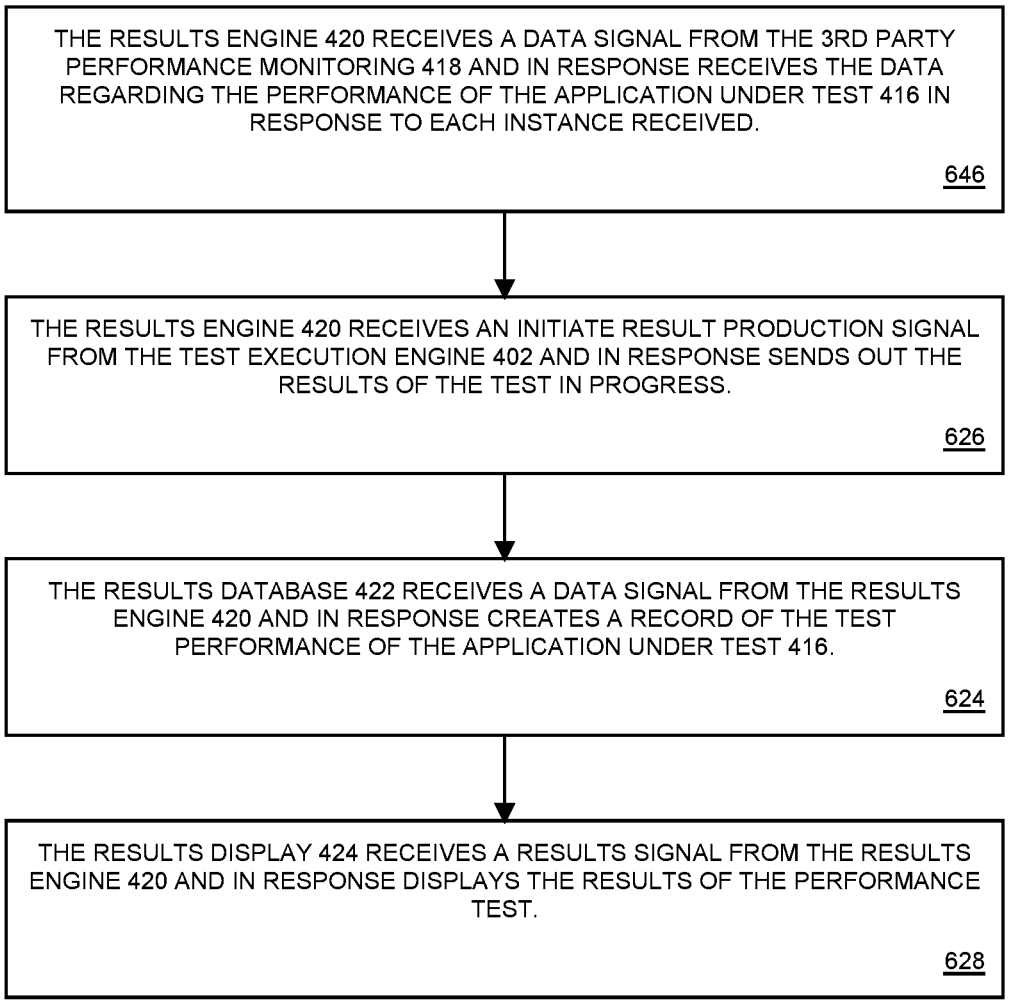
FIG. 7 is a flow chart of an embodiment of a system for performance testing cloud based applications.

FIG. 4 is a diagram of an embodiment of a system for performance testing cloud based applications. FIG. 5 is an action flow diagram of an embodiment of a system for performance testing cloud based applications. FIG. 6 is a flow chart of an embodiment of a system for performance testing cloud based applications. FIG. 7 is a flow chart of an embodiment of a system for performance testing cloud based applications. The system comprises Test Execution Engine 402, Front End 404, Instance 1 . . . n 414, Application Under Test 416, 3rd Party Performance Monitoring 418, Results Engine 420, Results Database 422, and Results Display 424. The Test Execution Engine 402 receives a request signal from the Front End 404 and in response the system sets up the necessary hardware and software infrastructure required to execute the test request (602). The Test Execution Engine 402 receives an inquiry signal from the Instance 1 . . . n 414 and in response checks the task queue for requested jobs. If a task is in the task queue, it is sent to the instance (648). The Instance 1 . . . n 414 receives a task signal from the Test Execution Engine 402 and in response runs the task (642). The Application Under Test 416 receives a task execution signal from the Instance 1 . . . n 414 and in response responds to the information sent in the request (620). The 3rd Party Performance Monitoring 418 receives a performance signal from the Application Under Test 416 and in response records performance data from the Application under test 416 according to each instance sent against the Application under test 416 (622). The Results Engine 420 receives a Data signal from the 3rd Party Performance Monitoring 418 and in response receives the data regarding the performance of the Application under test 416 in response to each instance received (646). The Results Engine 420 receives an initiate result production signal from the Test Execution Engine 402 and in response sends out the results of the test in progress (626). The Results Database 422 receives a data signal from the Results Engine 420 and in response creates a record of the test performance of the Application under test 416 (624). The Results Display 424 receives a results signal from the Results Engine 420 and in response displays the results of the performance test (628).

Elastic Load Balancer 810 balances the load from the requests sent from the plurality of servers 802, 804, 806, and 808 that form part of the cloud. While four servers are shown, this is an exemplary and not necessarily actual representation as one or more servers may be used to form part of the cloud and the number of servers used in the cloud is beyond the control of the user of this system. The App Server 1 812 can spawn as needed n times as shown with App Server x 814 as the number of users accessing the application increases. The system 800 may monitor congestion of the queue 816 and add more servers 814 as needed. relational database 826 may comprise a DB Master 828 and DB Slave 830. In some embodiments the relational database may provide automatic failover, backups or create a second Master mirror in a different region of the cloud. queue 816 is checked for job requests and each request is executed as 826 Instance 1 818, Instance 2 820, Instance 3 822, through Instance n 824. The data may then be aggregated using non-relational DB Map Reduce 832.

Elastic Load Balancer 910 balances the load from the requests sent from the plurality of servers 902, 904, 906, and 908 that form part of the cloud. While four servers are shown, this is an exemplary and not necessarily actual representation as one or more servers may be used to form part of the cloud and the number of servers used in the cloud is beyond the control of the user of this system. The App Server 1 912 can spawn as needed x times as shown with App Server X 914 as the number of users accessing the application increases. The system 900 may monitor congestion of the queue 916 and add more servers 814 as needed. relational database 826 may comprise a DB Master 928 and DB Slave 930. In some embodiments the relational database may provide automatic failover, backups or create a second Master mirror in a different region of the cloud. queue 916 is checked for job requests and each request is executed as 926 Instance 1 918, Instance 2 920, Instance 3 922, through Instance N 924 as required. instances are sent against Application Under Test 934. The behavior of the Application Under Test 934 and n instances may then be aggregated using non-relational DB Map Reduce 932.

Figure 8:
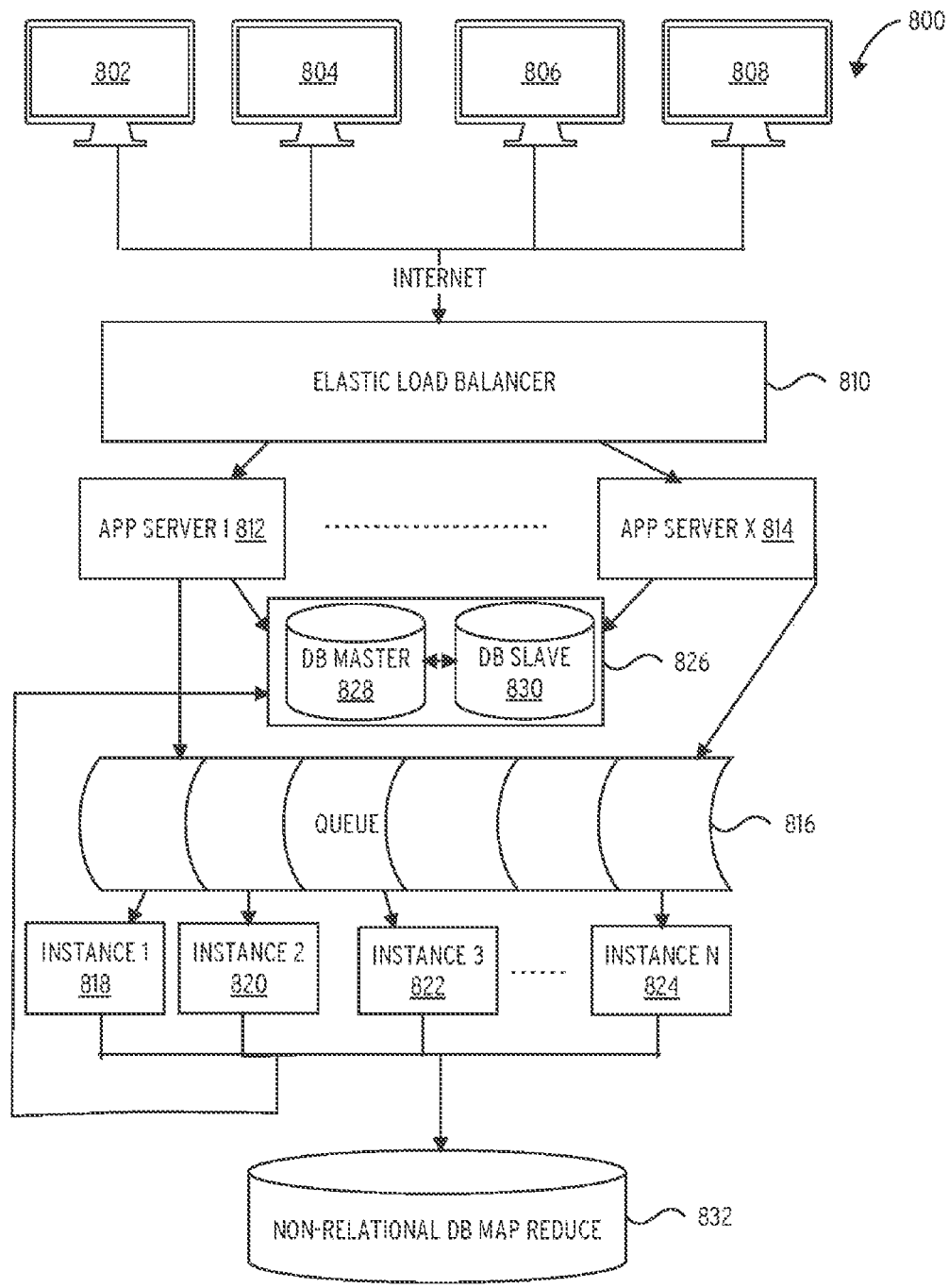
FIG. 8 is a figure depicting a system for performance testing cloud based applications.
Figure 9:
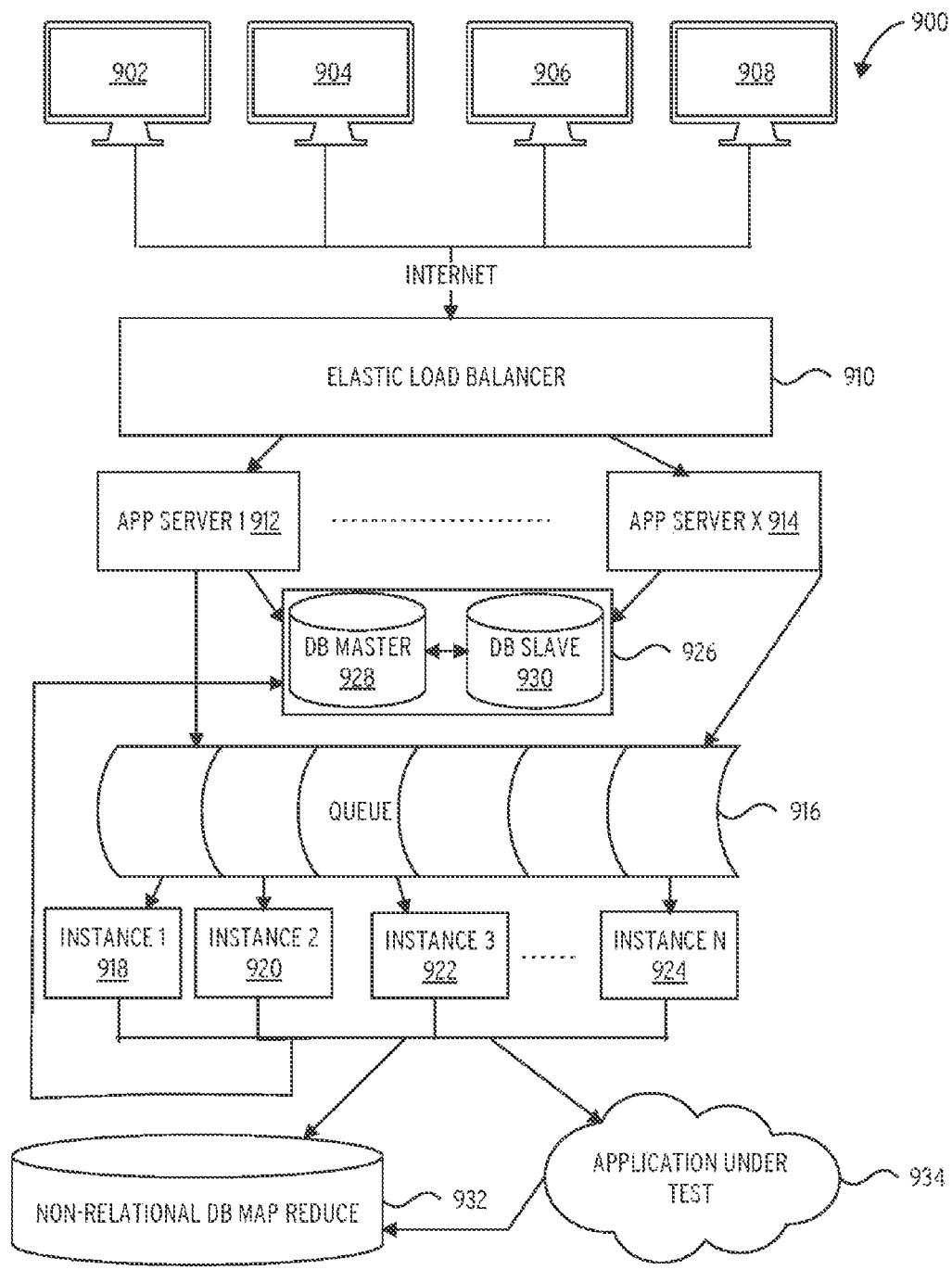
FIG. 9 is a figure depicting an embodiment of a system for performance testing cloud applications.

The systems illustrated in FIGS. 8 and 9 may be used as a platform to implement any of the systems and methods described above, as well as the systems and methods described below. Moreover, the systems and methods described above and below are applicable not only to web applications, but also other cloud services such as mobile applications, API endpoints, etc.

In some additional embodiments, systems and methods to generate web traffic from multiple concurrent geographic locations in the world for the purpose of performance testing web applications may generate automatically and programmatically synthetic users on demand in the public cloud to stress test applications according to specific and different traffic models. Such users may be synthetically generated via software and generate real traffic (i.e. web load) against the application under test. Synthetic users may be generated to execute web transactions at the same time from multiple concurrent physical locations in the world. By using the system and method, the user is able to measure performance as experienced in different locations around the world and uncover application performance issues that are related to geography.

In further embodiments, a system and a method for performance testing of web applications from multiple concurrent geographic locations in the world may enable a user to include one or more multiple geographic locations worldwide to generate synthetic users from.

In further embodiments, a system and a method for performance testing of web applications from multiple concurrent geographic locations in the world enables a user to include a large number of geographic locations either within the United States or worldwide to run synthetic traffic from. The system and method may include and utilize cloud resources in many different geographic locations in the world to execute performance testing. The system and method may utilize cloud resources spread across many different cloud providers. In other embodiments, the system and method may utilize a mix of cloud resources and dedicated servers and colocation servers.

In further embodiments, a system and a method for performance testing of web applications from multiple concurrent geographic locations in the world may split traffic across multiple geographic locations according to user-defined percentages. A user can define what percentage of traffic is running from each location, programmatically. The system and method may automatically split the traffic according to the percentages. The system and method may also analyze results coming from different geographic locations automatically. The system may be completely cloud-provider agnostic and may be supported on any or multiple cloud providers at the same time.

In further embodiments, a system and a method for performance testing of web applications from multiple concurrent geographic locations in the world may analyze results according to the different geographic locations selected during test creation and to the percentages of traffic assigned. A user may compare key performance metrics for each geographic location, and therefore identify performance degradations due to geography, network bandwidth, lack or presence of content deliver network, etc.

In further embodiments, a system and method may performance test mobile applications from multiple concurrent cloud-based geographic locations in the world, including Android applications, iOS and Microsoft mobile applications.

In further embodiments, a system and method may performance test API end points from multiple concurrent cloud-based geographic locations in the world, including Restful API and non Restful API.

In further embodiments, a system and method may performance test web sockets architectures from multiple concurrent cloud-based geographic locations in the world.

Figure 10:
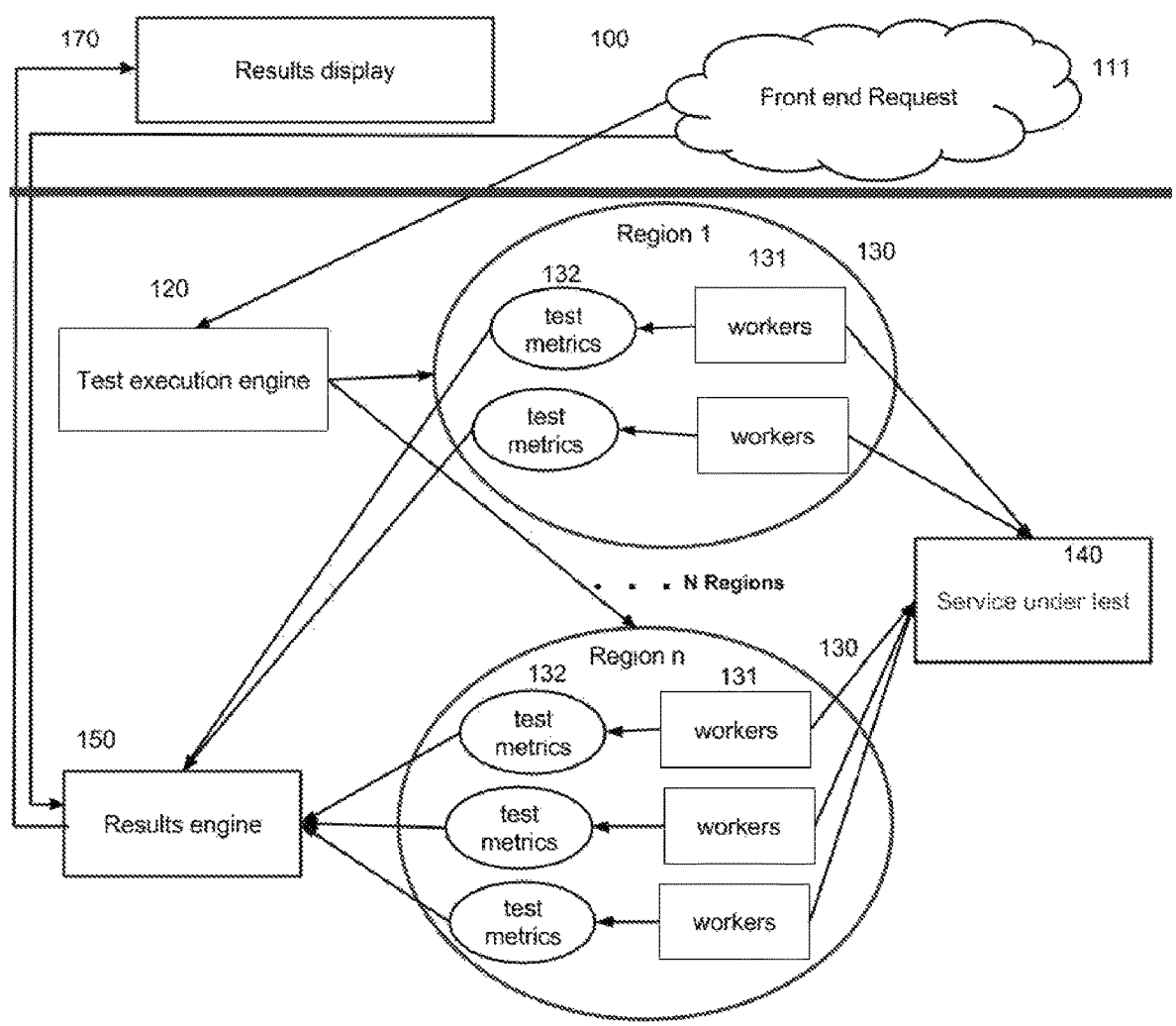
FIG. 10 is a block diagram of an embodiment of a system for performance testing cloud based applications from multiple concurrent cloud-based geographic locations.

An embodiment of a system such as that illustrated FIG. 10 may utilize multiple concurrent cloud resources located in different geographic locations to execute performance testing of a cloud service such as a web application. This system and method may be completely cloud agnostic and may be supported on any cloud provider. Moreover the service under test may be on any cloud provider.

A user may use the system to test speed and responsiveness of the service under test when traffic is coming from many different geographic locations, and derive a set of metrics that describe different aspects of speed and responsiveness, as experienced by the service's users. The system and method may generate web load, the user may specify what type of web load, and the system may measure user performance metrics. By using the system and method, a user may uncover performance issues. A user may use the system and method to derive accurate and realistic performance tests to test speed and responsiveness of the service under test, and derive a set of metrics that describe different aspects of speed and responsiveness, as experienced by the service's users. The system and method may record web transactions, save and archive them on cloud resources, replay the transaction with different payloads and convert the transaction into a test by pairing it up with synthetic users. By using the system and method, the user is able to uncover performance issues.

In some embodiments, a system and a method for performance testing of cloud services from multiple concurrent geographic locations in the world may generate web traffic from multiple concurrent geographic locations in the world. The system and method may also generate mobile traffic, as if from mobile users via mobile browsers or native mobile applications (e.g., iOS, Android, Microsoft), from multiple concurrent geographic locations. The system and method may also generate API traffic, as if exercising API endpoints, from multiple concurrent different geographic locations.

In some embodiments, the system and method may save and archive performance metrics pertinent to different geographies on cloud resources. The system and method may also filter out specific geographies/in the results analysis. The system and method may also compare web performance metrics from different locations. The system and method may also set specific performance goals for each location and to be notified when the performance goal is not met. The system and method may also create and run tests in an automated way via a specific API.

The system and method may also split the traffic and assign traffic percentages to the different geographies that are going to be executed concurrently.

In some embodiments, a system and a method for performance testing of a cloud service from multiple concurrent geographic locations in the world may do any or all of the following: (1) Allocate multiple workers (instances) in different cloud data centers around the world. The cloud data centers may be connected to each other or not. They may belong to the same cloud provider or not. (2) Automatically provision all the instances with the same image, so that their software versions are all aligned and in sync. (3) Have each instance represent one or more virtual users that generate traffic from that location, as if users were physically located there. (4) Have a centralized controller, or execution engine, that dispatches requests, and maintains status information about all the instances available in all regions in the world, including which ones are active, what tests are they executing, etc. (5) Provide a system for the instances, so that: (a) they can be notified by the execution engine when there is a job for them to execute; (b) they can be sent information on how to execute a test; and (c) they can send results back to central DB. (6) Synchronize all the virtual users executions. (7) Have a centralized cloud-based database where all results are stored once the execution is completed. (8) Collect results for each previously selected geographic location. (9) Process and generate reports for results for each geographic location. (10) Compare results for the same set of tests on different geographic locations. (11) Have a failure-tolerant mechanism and provide ability to work with slow connections, especially if they are remote.

An embodiment of a system as illustrated in FIG. 10 may include a front end 111, an execution engine 120, a number of regions executing in parallel 130, individual workers within the regions 131, test metrics for each region 132, the service under test 140, the results engine 150, and a results display engine 170. The front end 111 may be used by the end user via a web browser to configure the performance tests, select the specific regions, the overall level of traffic and the split among all the regions. In some embodiments, the execution engine 120 may be the core of the system. The execution engine 120 may receive a test spec from the front end module and organize the instances for test execution. The test execution engine 120 may kickstart, execute, and complete execution for the test that is created based on the test spec. It may be made of several modules which are independent from each other and communicate through a well defined interface.

A region 130 may represent a single geographic location. In some embodiments, workers may be defined as cloud-based server hardware resources located in the various geographic locations, available to execute the test, and controlled by a cloud provider. In some implementations, the service under test 140 may represent a web application, website or enterprise application under test. In other embodiments, the service under test may represent a mobile application accessible via a mobile browser. In other embodiments, the service under test may represent a mobile native application for iOS, android or Microsoft. In other embodiments, the service under test may represent a set of API endpoints.

In some embodiments, the results engine 150 receives and processes data from the back-end and does all the required statistical analysis. In some embodiments, the results visualization engine 170 displays the data, results, reports, and statistical analysis to the end user via a web browser interface.

In some embodiments the end user may start a multiple location tests from the front end 111. The front end sends a request to generate traffic from multiple locations to the execution engine. The execution engine 120 keeps track of the available regions and of all the workers in each region. It determines which regions 130 are involved in the test and how many workers are needed in each region. The number of workers in each region may differ, since it may be defined as a test parameter. The execution engine sends requests for test execution to the workers 131 located in the regions 130 involved in this specific test. The workers 131 needed in each region may be dynamically instantiated if they are not already available.

Each region 130 may have a pool of workers that can be dynamically allocated. The pool may also be dynamically expanded, as needed. The number of regions may also be expanded. As new regions are added, pools in these regions may also be allocated. The workers may generate the synthetic traffic towards the service under test 140. The workers may collect web performance metrics 132 on the service under test and send them to the results engine 150 The results engine 150 may process all the results and aggregate them per region. Results may then be visualized by the results visualization engine 170.

Figure 11:
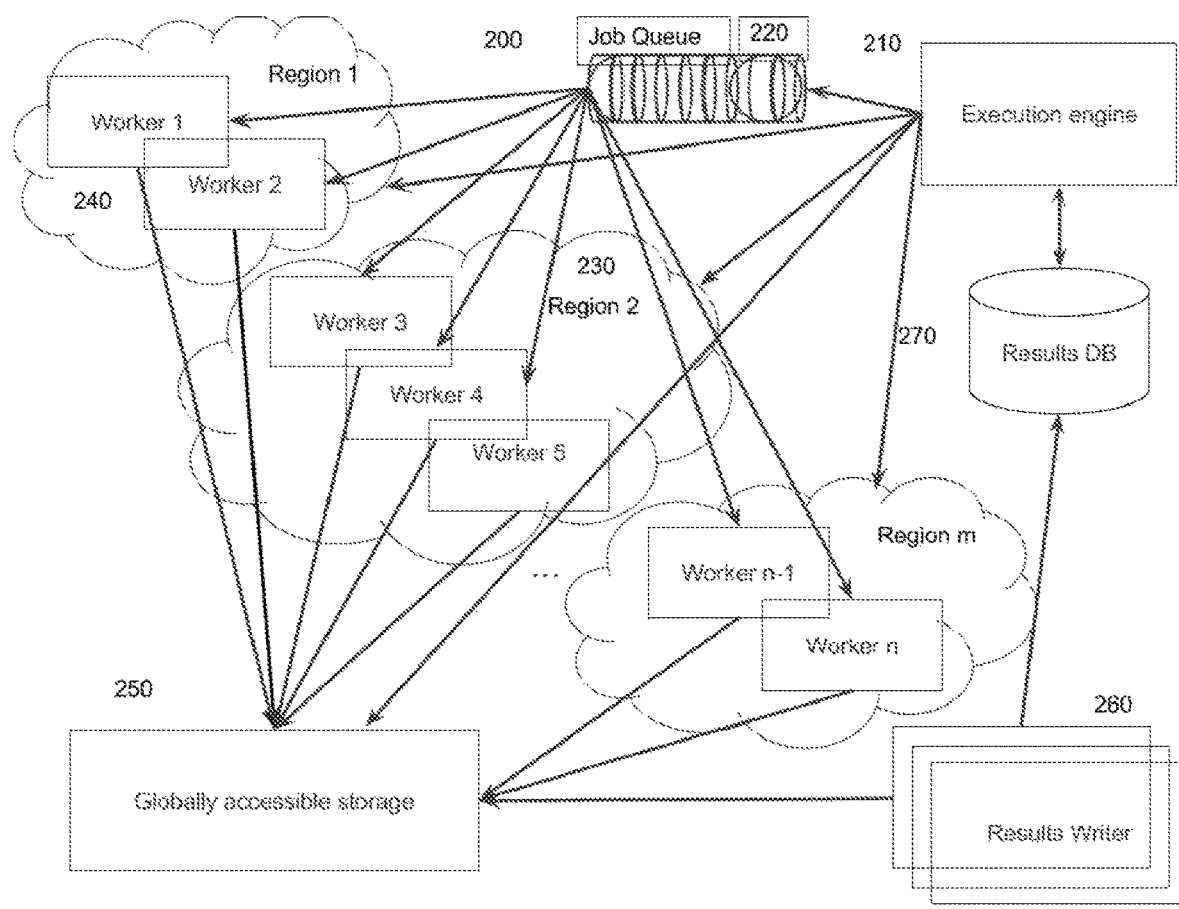
FIG. 11 is a diagram of an embodiment of a system for performance testing cloud based applications from multiple concurrent geographic locations.

FIG. 11 is a diagram of an embodiment of a system for performance testing cloud based services from multiple concurrent geographic locations. In some embodiments, the execution engine 210 receives a request to execute a test spec. The execution engine 210 may then send a job to the job queue 220 which is where all jobs (requests for test execution) may be placed. The job may get picked out by the workers instances 240 in each region 230 (geographic locations) required for the test and specified in the test spec. The test request information and test spec are then placed in a globally accessible job queue 220. When the workers execute the tests, they may collect all results and save them into cloud-based globally accessible storage 250 which may be a data repository accessible from all geographic locations, so that every region can access and post the relevant results and metrics. The result writer 260, which may be separate from the workers, may get the results from the globally accessible storage and write them in cloud-based results database 270. At that point the execution engine 210 may access all the results data.

The results writer 260 may access all the raw data results and writes them in the cloud database. Example of the metrics collected for each geographic location and each test run may include: (1) average response time for each request; (2) average response time vs. applied load for each request; (3) additional metrics like DNS time, SSL time, time to first byte, etc. for each request; (4) distribution of response times for each request; (5) $50^{th}$ percentile and $90^{th}$ percentiles for each request; (6) minimum and maximum for each request; (7) average response time aggregated for a complete transaction; (8) throughput aggregated for a complete transaction; (9) throughput and average response time versus applied load aggregated for a complete transaction; and (10) distribution of average response times aggregated for a complete transaction.

Figure 12:
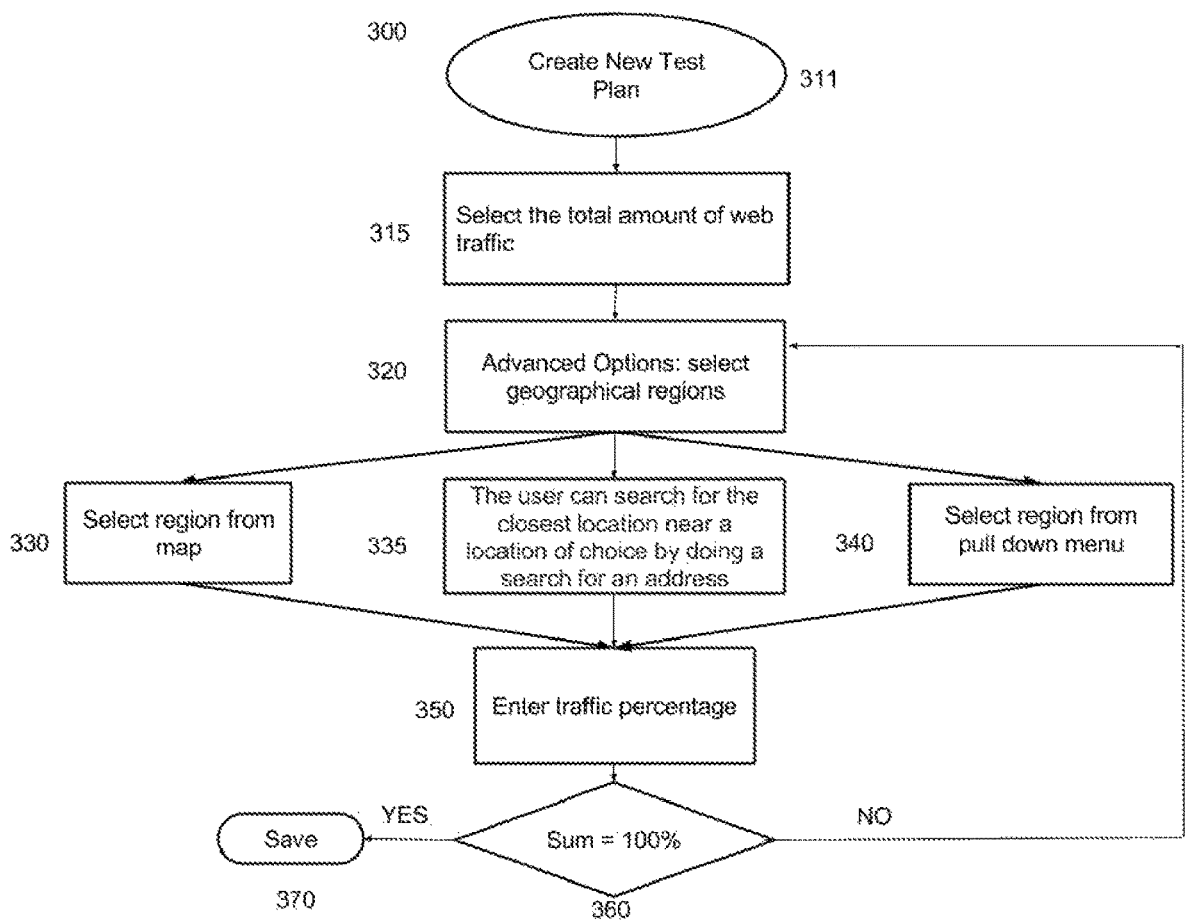
FIG. 12 is a flow chart of an example embodiment of a user work flow for performance testing cloud based applications from multiple concurrent geographic locations.

FIG. 12 is a flow chart of an example embodiment of a user work flow for the creation of a test for performance testing cloud based services from multiple concurrent geographic locations. In some embodiments, at test creation 311, the end user may select the total amount of web traffic 315 (virtual users) that need to be allocated to that test. As part of an advanced option 320 the end user may select from a list of available geographies that can be visualized as menu 340 or visualized on a map 330. Alternatively, the user may search for the closest location near a location of choice by doing a search for a specific address 335. For each region, a percentage of traffic may be specified 350. If the total is 100% 360 then the selection of geographic locations is completed, and the test spec is complete and may be archived on cloud based resources 370. If the total does not match 100%, then further geographic locations may be added or existing geographic locations may be modified, going back to 320.

Figure 13:
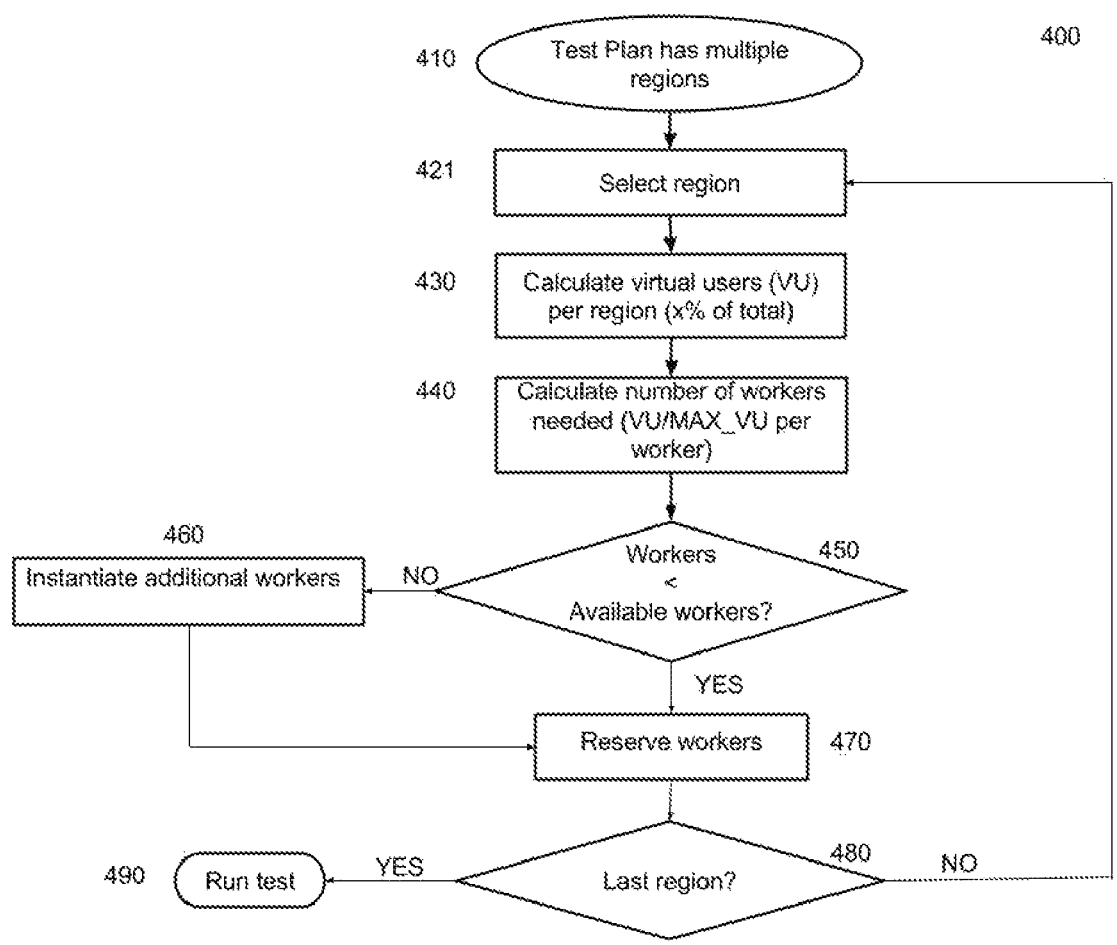
FIG. 13 is a block diagram of an example implementation of a method for allocating traffic to different geographic locations in accordance with one embodiment of the invention.

FIG. 13 is a block diagram of an example implementation of a method for allocating traffic to different geographic locations in accordance with one embodiment of the invention. In some embodiments, if the test spec contains multiple regions 410, the execution engine described at 200 may process each region 421, determine the percentage of traffic allocated to the regions 430 (as defined at 350 of FIG. 12), then calculate the number of workers needed to execute that traffic 440. If the workers are already present in that region 450, it may reserve them for test 470. If more workers are needed, the execution engine may automatically instantiate the additional workers 460. This may be repeated for all regions in the test spec. When the last region is ready 480, the system may execute a test 490.

Figure 14:
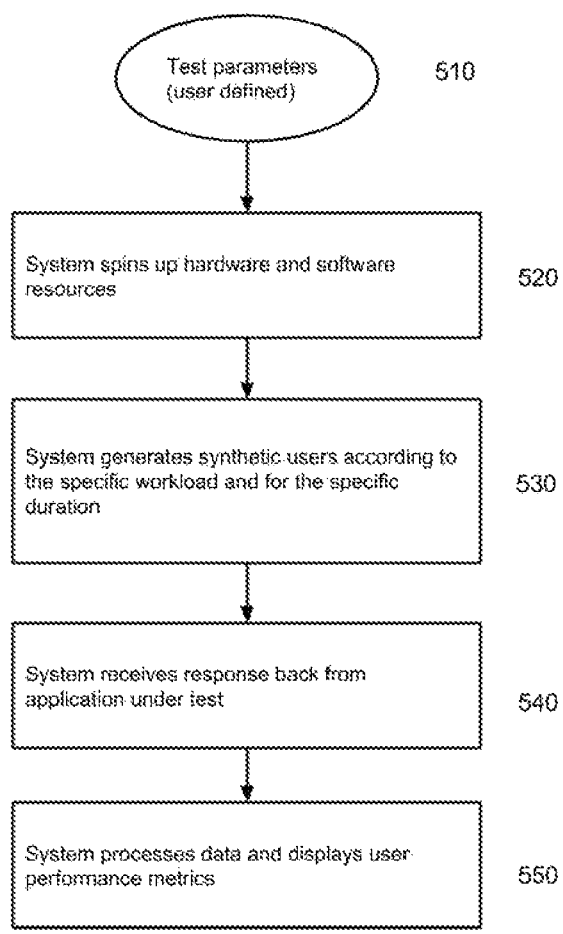
FIG. 14 is a block diagram of an example embodiment of a workflow for performance testing test execution.

FIG. 14 is a block diagram of an example embodiment of a workflow for performance testing test execution. The system receives information on the test from the user that enters the test parameters 510. The data may be the total number of virtual users that will be generated by the test, the application or other service under test, the specific workflows/transactions that need to be tested, the test duration, and in what geographic locations the virtual users (synthetic users) are based. In some embodiments, the system may set up the necessary hardware and software infrastructure 520 required to execute the test. The system may generate the synthetic users 530 based on the information entered by the end user in 510. This may include the load that the users will apply during test execution, and how long the virtual users will be generating the webload on the service under test. In some embodiments, the system may receive timing data and other information in real-time while the test is executing from the service under test 540. Once the test completes, the system may process the relevant web performance metrics which may then be displayed to the end user 550.

Figure 15:
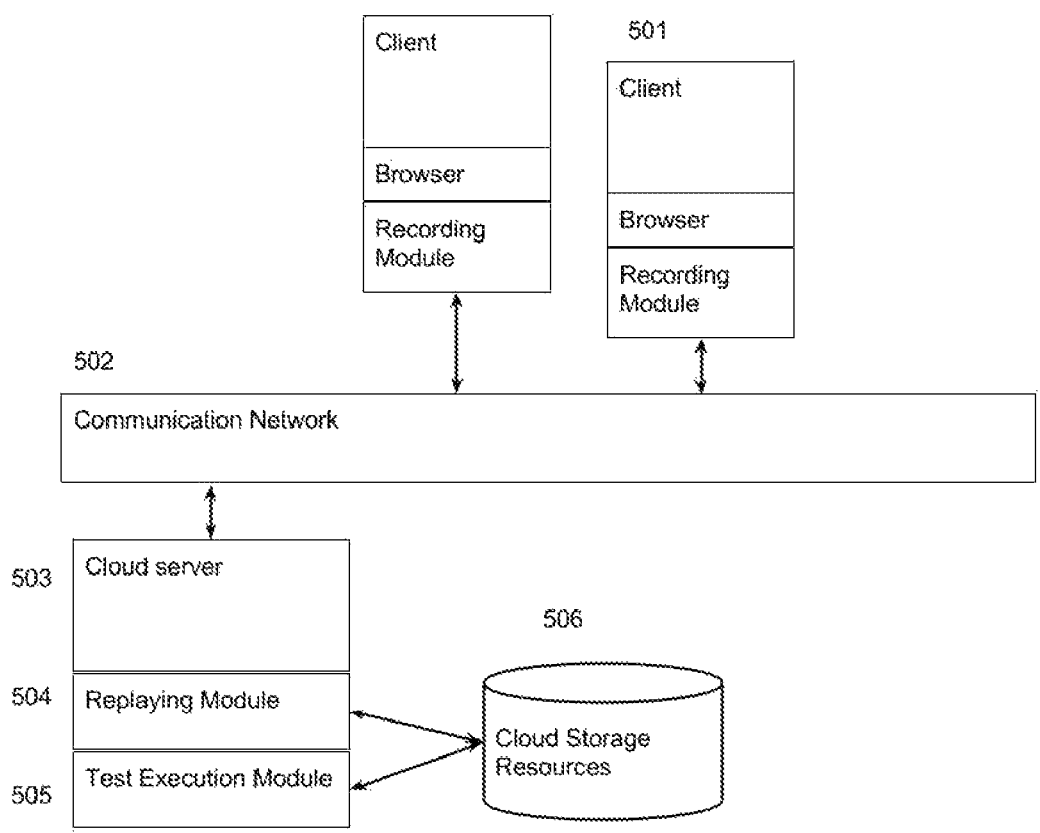
FIG. 15 is a block diagram of an example implementation of a method for recording and replaying a set of web transactions to the purpose of performance testing.

FIG. 15 is a block diagram of an example implementation of a method for recording and replaying a set of web transactions to the purpose of performance testing. In some embodiments, a recording module might reside jointly with a browser on a client system 501. In some embodiments, multiple clients with browsers and recording modules might be present at the same time 501. The client systems may communicate via a communication network 502 with a cloud server 503. The replaying module 504 and the test execution module 505 may be part of the web application and run on the cloud server. The Replaying module 504 may communicate with the recording module via the communication network. Recorded transactions may be stored on cloud storage resources 506.

In some additional embodiments, execution mechanisms, application servers, traffic generators, etc., may also emulate network traffic such as full broadband traffic and traffic on 3G and 4G networks. Thus, the systems and methods may simulate the behavior of mobile networks within the performance or load tests to enable a user to evaluate how applications or other cloud services perform under different network conditions. For example, for each network a user wants to emulate, the user may select a different combination of uplink speed, downlink speed and latency. These parameters may be added to any test plan, for example through a test creation and management interface in the cloud, or through a network interface on or more remotely distributed subscriber computers which may communicate with application servers that execute the tests using the network emulation parameters.

The network emulation principles may be used individually in a single geographic region, or together with the multiple geographic location capabilities described above. Moreover, in an implementation or test utilizing multiple locations, each region may be attributed a different set of network parameters. For example at test may be configured to use broadband network parameters in Europe while using 3G network parameters in South-East Asia. Results may be processed and gathered accordingly. Additionally, the systems and methods may perform comparisons between different types of network. Tests be run on different networks and results compared to see variations due to network conditions.

What is claimed is:
1. A cloud based performance testing system comprising:
a test creation and management interface in a cloud;
an execution mechanism on an application server which receives requests from the test creation and management interface in the cloud, processes the requests and generates load concurrently from multiple geographic locations in cooperation with an elastic load balancer based on parameters specified in the test creation and management interface and directed against a service under test in the cloud;
a results mechanism hardware server that collects, processes and stores performance measurements of the service under test from the multiple geographic locations in response to the load generated by the execution mechanism; and a display mechanism that presents on a screen the performance measurements collected by the results mechanism;

wherein the execution mechanism keeps track of available geographic regions, determines which regions are involved in a test, determines a number of workers needed for the test in each region, dynamically instantiates any workers in each region if they are not already available, and sends requests for test execution to the workers located in the regions involved in the test.

2. The cloud based performance testing system of claim 1, wherein the service under test comprises a web application, a mobile application, or an API endpoint.

3. The cloud based performance testing system of claim 1, wherein the display mechanism compares performance measurements from multiple geographic locations.

4. The cloud based performance testing system of claim 1, wherein the display mechanism filters out specific geographic locations.

5. The cloud based performance testing system of claim 1, wherein the test creation and management interface allows a user to assign traffic percentages to different geographic locations.

6. The cloud based performance testing system of claim 1, wherein the test creation and management interface allows a user to set different performance goals for different geographic locations.

7. A cloud based performance testing system comprising:
a plurality of remotely distributed subscriber computers connected to an internet;
a network interface to the plurality of remotely distributed subscriber computers;
a plurality of application servers which receive requests sent by the remotely distributed subscriber computers to test a cloud service;
a plurality of traffic generator computers located in multiple geographic regions which receive instructions from the plurality of application servers to generate synthetic user load concurrently in the multiple geographic regions;
a service under test residing on one or more first computers connected to the internet against which the synthetic user load is directed;
a master database residing on a second computer which receives, records and processes measurements of a performance of the service under test in response to the synthetic user load; and
a user interface which displays data of the performance of the service under test;
wherein the plurality of application servers emulate mobile network traffic; and
wherein the mobile network traffic is emulated by any combination of uplink speed, downlink speed, and latency.

8. The cloud based performance testing system of claim 7, wherein the plurality of application servers determine a percentage of traffic allocated to each of the geographic regions and calculates a number of workers needed to execute the traffic on the traffic generator computers located in the multiple geographic regions.

9. The cloud based performance testing system of claim 8, wherein for each of the geographic regions, the plurality of application servers reserves workers that are already present in the geographic region and instantiates additional workers in the geographic region if more are needed.

10. The cloud based performance testing system of claim 7, wherein the plurality of application servers provision multiple instances of workers with the substantially same image so the plurality of application servers are aligned and synchronized.

11. The cloud based performance testing system of claim 7, wherein the plurality of application servers dispatch requests and maintain status information about workers available in each of the geographic regions.

* * * * *